United States Patent
Jagmohan et al.

(10) Patent No.: US 10,657,189 B2
(45) Date of Patent: *May 19, 2020

(54) JOINT EMBEDDING OF CORPUS PAIRS FOR DOMAIN MAPPING

(71) Applicant: International Business Machines Corporation, Armonk, NY (US)

(72) Inventors: Ashish Jagmohan, Irvington, NY (US); Elham Khabiri, Briarcliff Manor, NY (US); Richard B. Segal, Chappaqua, NY (US); Roman Vaculin, Bronxville, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 791 days.

This patent is subject to a terminal disclaimer.

(21) Appl. No.: 15/240,660

(22) Filed: Aug. 18, 2016

(65) Prior Publication Data
US 2018/0052924 A1    Feb. 22, 2018

(51) Int. Cl.
*G06F 16/951*    (2019.01)
*G06N 20/00*    (2019.01)
(Continued)

(52) U.S. Cl.
CPC ......... *G06F 16/951* (2019.01); *G06N 3/0454* (2013.01); *G06N 3/084* (2013.01); *G06N 20/00* (2019.01)

(58) Field of Classification Search
CPC .................................................. G06F 16/951
See application file for complete search history.

(56) References Cited

U.S. PATENT DOCUMENTS

| 6,961,712 B1 | 11/2005 | Perkowski |
| 7,158,983 B2 | 1/2007 | Willse et al. |

(Continued)

OTHER PUBLICATIONS

U.S. Appl. No. 15/240,649, filed Aug. 18, 2016.
U.S. Appl. No. 15/240,664, filed Aug. 18, 2016.
(Continued)

*Primary Examiner* — Tuankhanh D Phan
(74) *Attorney, Agent, or Firm* — Amin, Turocy & Watson, LLP

(57) ABSTRACT

Techniques for outside-in mapping for corpus pairs are provided. In one example, a computer-implemented method comprises: inputting first keywords associated with a first domain corpus; extracting a first keyword of the first keywords; inputting second keywords associated with a second domain corpus; generating an embedded representation of the first keyword via a trained model and generating an embedded representation of the second keywords via the trained model; and scoring a joint embedding affinity associated with a joint embedding. The scoring the joint embedding affinity comprises: transforming the embedded representation of the first keyword and the embedded representation of the second keywords via the trained model; determining an affinity value based on comparing the first keyword to the second keywords; and based on the affinity value, aggregating the joint embedding of the embedded representation of the first keyword and the embedded representation of the second keywords within the second domain corpus.

20 Claims, 11 Drawing Sheets

(51) Int. Cl.
*G06N 3/04* (2006.01)
*G06N 3/08* (2006.01)

(56) References Cited

U.S. PATENT DOCUMENTS

| | | | |
|---|---|---|---|
| 7,761,394 | B2 | 7/2010 | Acharya et al. |
| 8,156,154 | B2 | 4/2012 | Taranov et al. |
| 8,280,856 | B2 | 10/2012 | Rohan et al. |
| 8,392,472 | B1 | 3/2013 | Gupta et al. |
| 8,396,708 | B2 | 3/2013 | Park et al. |
| 8,452,773 | B1 | 5/2013 | Young |
| 8,498,906 | B2 | 7/2013 | Zmolek |
| 8,527,893 | B2 | 9/2013 | Agrawal et al. |
| 8,566,306 | B2 | 10/2013 | Jones |
| 8,750,578 | B2 | 6/2014 | Neghina et al. |
| 8,935,275 | B2 | 1/2015 | Rathod |
| 9,031,293 | B2 | 5/2015 | Kalinli-Akbacak |
| 9,110,922 | B2 | 8/2015 | Bengio et al. |
| 2006/0294086 | A1 | 12/2006 | Rose et al. |
| 2009/0041312 | A1 | 2/2009 | Wakasugi |
| 2009/0285456 | A1 | 11/2009 | Moon et al. |
| 2010/0169343 | A1* | 7/2010 | Kenedy ............... G06F 16/285 707/758 |
| 2011/0115937 | A1 | 5/2011 | Sassa |
| 2014/0016860 | A1 | 1/2014 | Senechal et al. |
| 2014/0226877 | A1 | 8/2014 | Je et al. |
| 2014/0310208 | A1 | 10/2014 | Fasel et al. |
| 2015/0071557 | A1 | 3/2015 | Movellan et al. |
| 2016/0026617 | A1 | 1/2016 | Avner et al. |
| 2016/0062986 | A1 | 3/2016 | Seuss |
| 2016/0180722 | A1 | 6/2016 | Yehezkel et al. |
| 2017/0109603 | A1 | 4/2017 | Wang et al. |
| 2017/0160813 | A1 | 6/2017 | Divakaran et al. |
| 2017/0330029 | A1 | 11/2017 | Turcot et al. |
| 2018/0144649 | A1 | 5/2018 | el Kaliouby et al. |
| 2019/0005313 | A1 | 1/2019 | Vemulapalli et al. |

OTHER PUBLICATIONS

Chiao et al., "Looking for Candidate Translational Equivalents in Specialized, Comparable Corpora," Proceedings of the 19th International Conference on Computational Linguistics (COLING '02), 2002, vol. 2, Association for Computational Linguistics, Stroudsburg, PA, USA, 6 pages.

Udupa et al., "Mining Named Entity Transliteration Equivalents from Comparable Corpora," Proceedings of the 17th ACM Conference on Information and Knowledge Management (CIKM '08), 2008, pp. 1423-1424, ACM, New York, NY, USA.

Vulic et al., "Monolingual and Cross-Lingual Information Retrieval Models Based on (Bilingual) Word Embeddings," Proceedings of the 38th International ACM SIGIR Conference on Research and Development in Information Retrieval (SIGIR '15), 2015, pp. 363-372, ACM, New York, NY, USA.

Zahran et al., "Word Representations in Vector Space and their Applications for Arabic," Computational Linguistics and Intelligent Text Processing, 2015, pp. 430-443, vol. 9041, Springer International Publishing.

Mikolov et al., "Exploiting Similarities among Languages for Machine Translation," 2013, 10 pages.

Notice of Allowance received for U.S. Appl. No. 15/240,649 dated Jul. 1, 2019, 24 pages.

Notice of Allowance received for U.S. Appl. No. 15/791,821 dated Jul. 17, 2019, 30 pages.

Final Office Action received for U.S. Appl. No. 15/240,664 dated Aug. 21, 2019, 15 pages.

Non-Final Office Action received for U.S. Appl. No. 15/791,821 dated Apr. 4, 2019, 24 pages.

Non-Final Office Action received for U.S. Appl. No. 15/240,649 dated Jan. 2, 2019, 21 pages.

Patwardhan et al., "Effective INformation Extraction with SEmantic Affinity Patterns and Relevant Regions". Jun. 2007. Proceedings of the 2007 Joint Conference on Empirical Methods in Natural Language Processing and Computational Natural LanguageLearning. pp. 717-727.

Dobrisek et al., "Towards Efficient Multi-Modal Emotion Recognition," International Journal of Advanced Robotic Systems,© 2013, 10 pages.

Non-Final Office Action received for U.S. Appl. No. 15/240,664 dated Jan. 2, 2019, 33 pages.

List of IBM Patents or Applications Treated as Related.

\* cited by examiner

JOINT EMBEDDING OF CORPUS PAIRS FOR DOMAIN MAPPING

BACKGROUND

The subject disclosure relates to corpus pairs, and more specifically, to mapping of corpus pairs.

SUMMARY

The following presents a summary to provide a basic understanding of one or more embodiments of the disclosure. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate outside-in mapping for corpus pairs are described.

According to an embodiment, a computer program product for managing a mapping process can comprise a computer readable storage medium having program instructions embodied therewith. The program instructions can be executable by a processor and the processor can execute a first portion of a thread of execution. The program instructions can also be executable to input a plurality of first keywords associated with a first domain corpus, and extract a first keyword of the plurality of first keywords. The program instructions can also be executable to input of a plurality of second keywords associated with a second domain corpus, generate a first embedded representation of the first keyword via a trained model, and generate a second embedded representation of the second keywords via the trained model. The program instructions can also be executable to score a joint embedding affinity associated with a joint embedding, wherein the scoring the joint embedding affinity comprises: transforming the first embedded representation of the first keyword and the second embedded representation of the second keywords via the trained model, and determining an affinity value based on comparing the first keyword to the second keywords. Based on the affinity value, scoring the joint embedding affinity comprises aggregating the joint embedding of the first embedded representation of the first keyword and the second embedded representation of the second keywords within the second domain corpus.

According to another embodiment, a computer-implemented method is provided. The computer-implemented method can comprise analyzing, by a device operatively coupled to a processor, first domain data associated with a domain comprising a first corpus, resulting in first analyzed data. The computer-implemented method can also comprise analyzing, by the device, second domain data associated with a second domain comprising a second corpus, resulting in second analyzed data. Based on the analyzing the first domain data and the analyzing the second domain data, the computer-implemented method can comprise identifying, by the device, equivalent terms between the first domain data and the second domain data. Additionally, based on the equivalent terms, the first analyzed data, and the second analyzed data, the computer-implemented method can comprise jointly embedding, by the device, the first domain data and the second domain data, resulting in jointly embedded data; and in response to the jointly embedding, the computer-implemented method can comprise outputting, by the device, a model associated with the jointly embedded data.

According to yet another embodiment, a computer-implemented method is provided. The computer-implemented method can comprise generating, by a device operatively coupled to a processor, a first embedded representation of a profile term of the first terms, associated with a user identity profile, via a trained model, wherein the first terms are associated with the user identity profile of a first domain corpus. The computer-implemented method can also comprise generating, by the device, a second embedded representation of second terms, associated a second domain corpus, via the trained model. Additionally, the computer-implemented method can also comprise comparing, by the device, the profile term to the second terms to determine an affinity value based on a joint embedding of the first embedded representation and the second embedded representation, resulting in a comparison data. The computer-implemented method can also comprise generating, by the device, based on the affinity value, display data associated with the comparison data for display by a webpage.

In some embodiments, one or more of the above elements described in connection with the systems, computer-implemented methods and/or computer program programs can be embodied in different forms such as a computer-implemented method, a computer program product, or a system.

DETAILED DESCRIPTION

Figure 1:
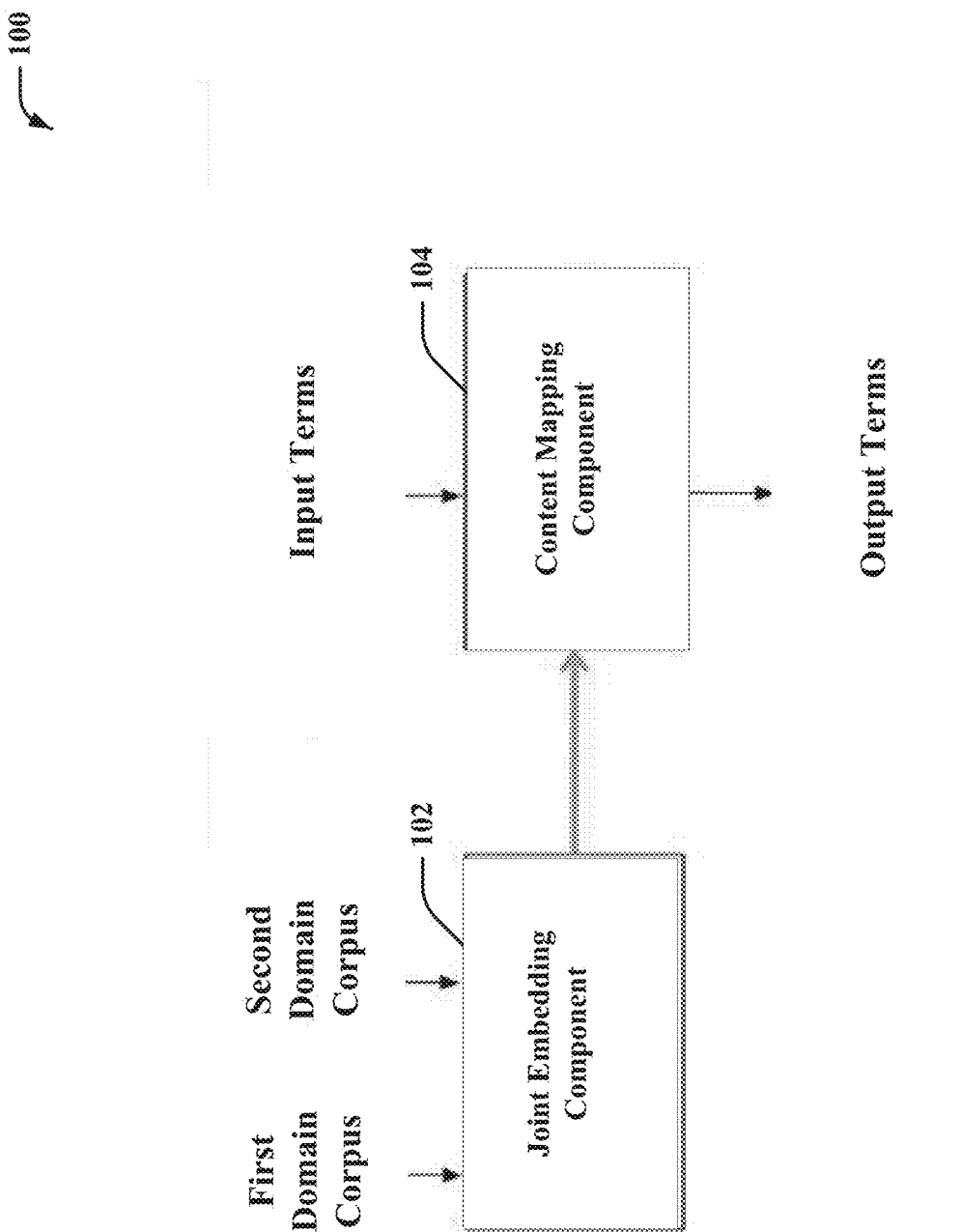
FIG. 1 illustrates a block diagram of an example, non-limiting system that facilitates joint embedding of corpus pairs for outside-in mapping in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Companies can leverage search engine optimization (SEO) and keyword experts to manually curate lists of important keywords and map to company tags/content. However, manual data entry can have inherent scaling issues and generate long lead times to optimize the lists and mappings. Commonly related items can have different associated terminology across various companies or organizations. For instance, by various companies, the term "expert systems" can be referred to as "unified computing systems," the term "cognitive computing" can be referred to as "artificial intelligence," and the term "digital experience" can be referred to as "customer engagement." However, effective marketing can require content to be readily searchable and personalized.

Outside-in language can mean language that is external to a domain corpus. Outside-in language be compared to language that is internal to the domain corpus. Language that is internal to the domain corpus can be found within the domain corpus and language that is external to the domain corpus may not necessarily be found in the domain corpus.

This disclosure describes systems, computer-implemented methods and/or computer program products that can leverage corpus pairs to learn outside-in term mappings for taxonomies and content in an automated and unsupervised manner (e.g., no labeling of terms are required). In linguistics, a "corpus" or "corpora" can mean a set of text (usually electronically stored and processed). As used herein, the terms "corpus" and/or "corpora" can be employed interchangeably as appropriate to indicate one corpus or multiple corpus, respectively. A corpus can be employed to perform statistical analysis and hypothesis testing and/or validation of linguistic rules within a specific language or the like. In various embodiments, a corpus can contain text data in a single language (monolingual corpus) or text data in multiple languages (multilingual corpus).

Multilingual corpora that have been specially formatted for side-by-side comparison are called aligned parallel corpora. There are two main types of parallel corpora, which contain texts in two languages. In a translation corpus, the texts in one language are translations of texts in the other language. In a comparable corpus, the texts are of the same kind and cover the same content, but they are not translations of each other. To exploit a parallel corpus, text alignment identifying substantially equivalent text segments (phrases or sentences) can be employed to facilitate analysis. It should be noted that any reference to the term "equivalent" herein can mean substantially equivalent terms and/or synonymous terms.

Different corpora can have different levels of analysis applied. For example, some smaller corpora (e.g., treebank corpora or parsed corpora), that may include one to three million words, can be fully parsed. Other levels of linguistic structured analysis are possible including annotations, morphology, semantics and/or pragmatics. Corpora are the main knowledge base in corpus linguistics and can be considered as a type of foreign language writing aid as the contextualized grammatical knowledge acquired by non-native language users through exposure to authentic texts in corpora can allow learners to grasp the manner of sentence formation in the target language, enabling effective writing.

One or more embodiments described herein include systems, computer-implemented methods, apparatus, and computer program products that facilitate outside-in term mappings for taxonomies and content. Frequently-occurring technical terms can be identified, which are common across multiple corpora. According to one embodiment, to identify known equivalent terms, technical terms can be determined based on a comparison to a non-technical background corpus. In some embodiments, terms that have more than the threshold number of occurrences, or frequency, in both corpora can be identified. For one or more terms t, which satisfies the above condition, a known equivalent pair can be generated as (t, t).

FIG. 1 illustrates a block diagram of an example, non-limiting system 100 that facilitates joint embedding of corpus pairs for outside-in mapping in accordance with one or more embodiments described herein. In various embodiments, the system 100 can be associated with or included in a data analytics system, a data processing system, a graph analytics system, a graph processing system, a big data system, a social network system, a speech recognition system, an image recognition system, a graphical modeling system, a bioinformatics system, a data compression system, an artificial intelligence system, an authentication system, a syntactic pattern recognition system, a medical system, a health monitoring system, a network system, a computer network system, a communication system, a router system, a server system or the like.

In one embodiment, the system 100 can perform joint embedding based on receipt of a first domain corpus and a second domain corpus. For example, in one embodiment, the system 100 can perform a joint embedding approach comprising embedding one or more domains comprising corpora into an embedding space using a statistical language model. In some embodiments, the domains can be asymmetric, meaning that one domain can have significantly more data than another domain. The statistical language model can be represented as a probability distribution over sequences of words in some embodiments. For example, given a sequence of words of length m, a probability $P(w_1, \ldots, w_m)$ can be assigned, wherein $w_1$ can represent a first word of a sequence of words. The ability for system 100 to estimate the relative likelihood of different combinations of word orders (e.g., different phrases) can be employed in many natural language processing applications including, but not limited to, speech recognition, machine translation, part of speech (POS) tagging, parsing, handwriting recognition, information retrieval and other applications.

Language models can also be used by system 100 in information retrieval in a query likelihood model. A separate language model can be associated with one or more documents in a collection. Documents can be ranked based on the probability of the query in the document's language model.

According to system 100, in one or more embodiments, neural network language models can be constructed and trained as probabilistic classifiers that learn to predict a probability distribution, meaning that the system 100 can be trained to predict a probability distribution over the vocabulary, given some linguistic context. In one embodiment, this can be done using standard neural network training algorithms such as stochastic gradient descent with back propagation. The context can be a fixed-size window of previous words, so that the network predicts from a feature vector representing the previous k words. In another embodiment, system 100 can cause the neural network to learn the context, and given a word maximize the log-probability $\Sigma_{-k \le j-1, j \le k} \log P(w_{t+j}|w_t)$.

The system 100 can be employed to use hardware and/or software to solve problems that are highly technical in nature (e.g., word searches, semantic tagging, determination of term frequency, matching of disparate terms within corpora composed of millions of terms), that are not abstract and that cannot be performed as a set of mental acts by a human due to the processing capabilities need to facilitate unsupervised term mapping, for example. Further, some of the processes performed may be performed by a specialized computer for carrying out defined tasks related to memory operations. For example, a specialized computer can be employed to carry out tasks related to joint learning, content mapping or the like.

The systems 100, 200, 300, 400, 500, 600 and/or 700 and/or components of the systems 100, 200, 300, 400, 500, 600 and/or 700 can be employed to solve new problems that arise through advancements in technology, computer networks, the Internet and the like. For example, the new problems solved can be or include distribution and/or selection of information for particular entities based on a relationship between terminology used on a user profile and terminology used on a plurality of other user profiles.

In the embodiment shown in FIG. 1, the system 100 can include a joint embedding component 102, and content mapping component 104, which can be electrically and/or communicatively coupled to one another in various embodiments. As shown in FIG. 1, the joint embedding component 102 can be communicatively coupled to the content mapping component 104. In an aspect, the content mapping component 104 can be or include a hardware accelerator for the processor that provides improved processing performance. For example, processing performance and/or processing efficiency of the system 100 can be improved by employing one or more of the embodiments described herein in connection with the joint embedding component 102 and the content mapping component 104.

Joint embedding component 102 can be or include a processor that can perform joint embedding of multiple corpora. In one embodiment, joint embedding can be learned by the system 100 via a mathematical transform from one embedded domain to another. In another aspect, the joint embedding component 102 can be built based on a first domain corpus and a second domain corpus to form a corpus pair. Selected terms of the corpus pair can then be considered equivalent terms to learn joint embedding. Known non-equivalent terms can be generated by randomly permuting one of the two terms in a known equivalent pair.

In some embodiments, domain data related to the first domain corpus and the second domain corpus can be received as an input by the system 100 and, in some embodiments, as an input to the joint embedding component 102. Accordingly, the joint embedding component 102 can jointly embed the corpus pair.

In various embodiments, the first domain corpus and the second domain corpus can be received from different locations. For instance, in some embodiments, the first domain corpus can be received from an external website of a company or entity while the second domain corpus can be received from an internal website to the company or entity.

Based on the first domain corpus input and the second domain corpus input to the joint embedding component 102, a joint embedding model can be built by the joint embedding component 102. In some embodiments, the first domain corpus input and/or the second domain corpus input can comprise term data. The joint embedding model can build the joint embedding model to comprise term data from one or more (or, in some embodiments, both) of the first domain corpus and the second domain corpus.

The content mapping component 104 can be a processor that can perform mapping of terms associated with the first domain corpus to terms associated with the second domain corpus. In one embodiment one or more words can be mapped onto an n-dimensional real vector called the word embedding, wherein n can be the size of the layer just before the output layer. Also, corpora from various different domains can be mapped to a joint embedding. In some embodiments, the joint embedding can be used to map a new term appearing in one domain to another term in the other domain by system 100. Unsupervised learning can stem from an association of frequent technical terms, which are common across both corpora. In some embodiments, a process can use a neural network in an unsupervised manner to map concepts from one domain (e.g., taxonomy) to another (e.g., internal corpus of a company).

In some embodiments, one or more input terms can be received by the content mapping component 104 from the input terms input into the joint embedding component 102. It should be noted that for the sake of brevity "data" can comprise "input terms" as shown in FIG. 1. In various embodiments, the data can comprise some form of keywords, taxonomy tags, content, and/or user profiles. It should be appreciated that to perform the content mapping, the content mapping component 104 can receive an output of the joint embedding component 102 and an input (e.g., shown as "input terms" in FIG. 1) based on the keywords, taxonomy tags, content, and/or user profiles. In one embodiment, the mapping can be performed by mapping at least substantially equivalent terms between the first domain corpus and the second domain corpus. After mapping the aforementioned inputs, the content mapping component 104 can generate output terms that are equivalent between the first domain corpus and the second domain corpus. The output terms can comprise internal taxonomy terms, generic terms, and/or generic content terms.

Figure 2:
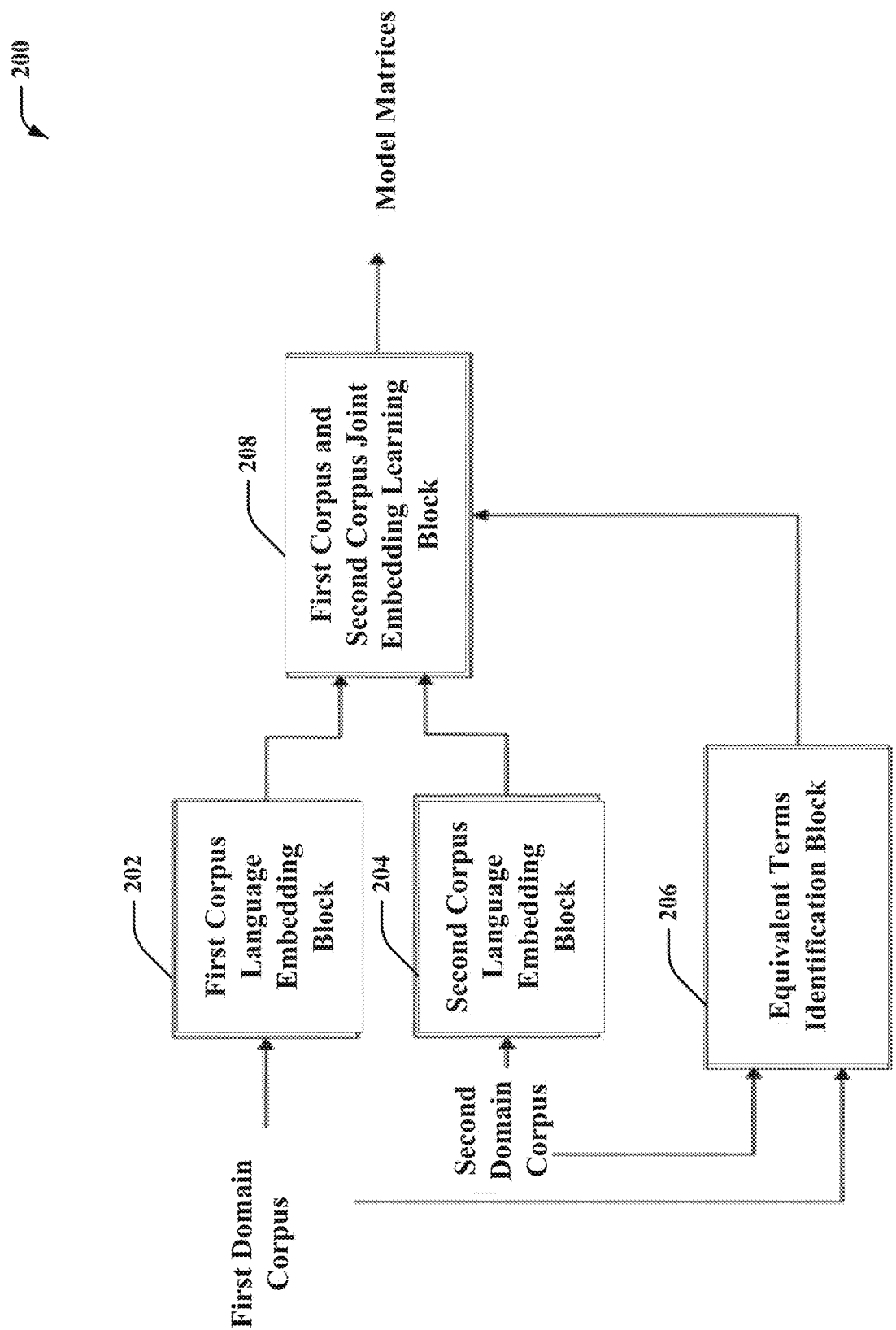
FIG. 2 illustrates another block diagram of an example, non-limiting system that facilitates joint embedding of corpus pairs for outside-in mapping in accordance with one or more embodiments described herein.

FIG. 2 illustrates another block diagram of an example, non-limiting system that facilitates joint embedding of corpus pairs for outside-in mapping in accordance with one or more embodiments described herein. In various embodiments, the system 200 can be a multi-processor system and/or a multi-memory system. Repetitive description of like elements employed in other embodiments described herein is omitted for sake of brevity.

In some embodiments, a first domain corpus can be received as an input at first corpus language embedding block 202. First corpus language embedding block 202 can analyze and learn the language embedding for the first domain corpus. By way of example, but not limitation, the first corpus language embedding block 202 can analyze and/or learn the language embedding for the first domain corpus by learning word embeddings for terms within the first domain corpus. In some embodiments, first corpus language embedding block 202 can output information indicative of the language embedding of the first domain corpus to block 208.

A second domain corpus can be received as an input to second corpus language embedding block 204. Second corpus language embedding block 204 can analyze and learn the language embedding for the second domain corpus. By way of example, but not limitation, the second corpus language embedding block 204 can analyze and/or learn the language embedding for the second domain corpus by learning word embeddings for terms within the first domain corpus. In some embodiments, second corpus language embedding block 204 can output information indicative of the language embedding of the second domain corpus to block 208. It should be appreciated that although there are only two domains represented within FIG. 2, the system 200 can process data from more than two domains in a similar manner to that described for the two domain corpora.

In some embodiments, as shown, both the first domain corpus embedding and the second domain corpus embedding can be output from the first corpus language embedding block 202 and/or the second corpus language embedding block 204 and received as inputs at first corpus and second corpus joint embedding learning (FSJEL) block 208. Furthermore, equivalent terms between the first domain corpus and the second domain corpus can be identified by equivalent terms identification block 206. Equivalent terms identification block 206 can identify known equivalent terms between the first domain corpus and the second domain corpus by identifying technical terms that are common to both corpora, where technical terms can be identified by comparing to background non-technical corpus. In some embodiments, the equivalent terms identification block 206 can output one or more known equivalent terms to FSJEL block 208.

In some embodiments, FSJEL block 208 can receive embedding data related to the learned language embedding from first corpus language embedding block 202, the learned language embedding from the second corpus language embedding block 204, and equivalent term data related to the one or more known equivalent terms from equivalent terms identification block 206. The aforementioned inputs to FSJEL block 208 can be processed by FSJEL block 208 to learn a joint embedding between the first domain corpus and the second domain corpus.

In some embodiments, the learned joint embedding as processed by FSJEL block 208 can generate a scoring and/or an affinity value as related to the similarity of two terms across both domains. Thereafter, the learned joint embedding comprising an assessment of the mapping between the phrases of the two corpora can be output from FSJEL block 208 as a model for further processing. As shown, the model can be one or more model matrices in some embodiments. In some embodiments, the model can be received by computation blocks 404, 406 (described below with reference to FIG. 4) to leverage across other domains to generate additional terms.

Figure 3:
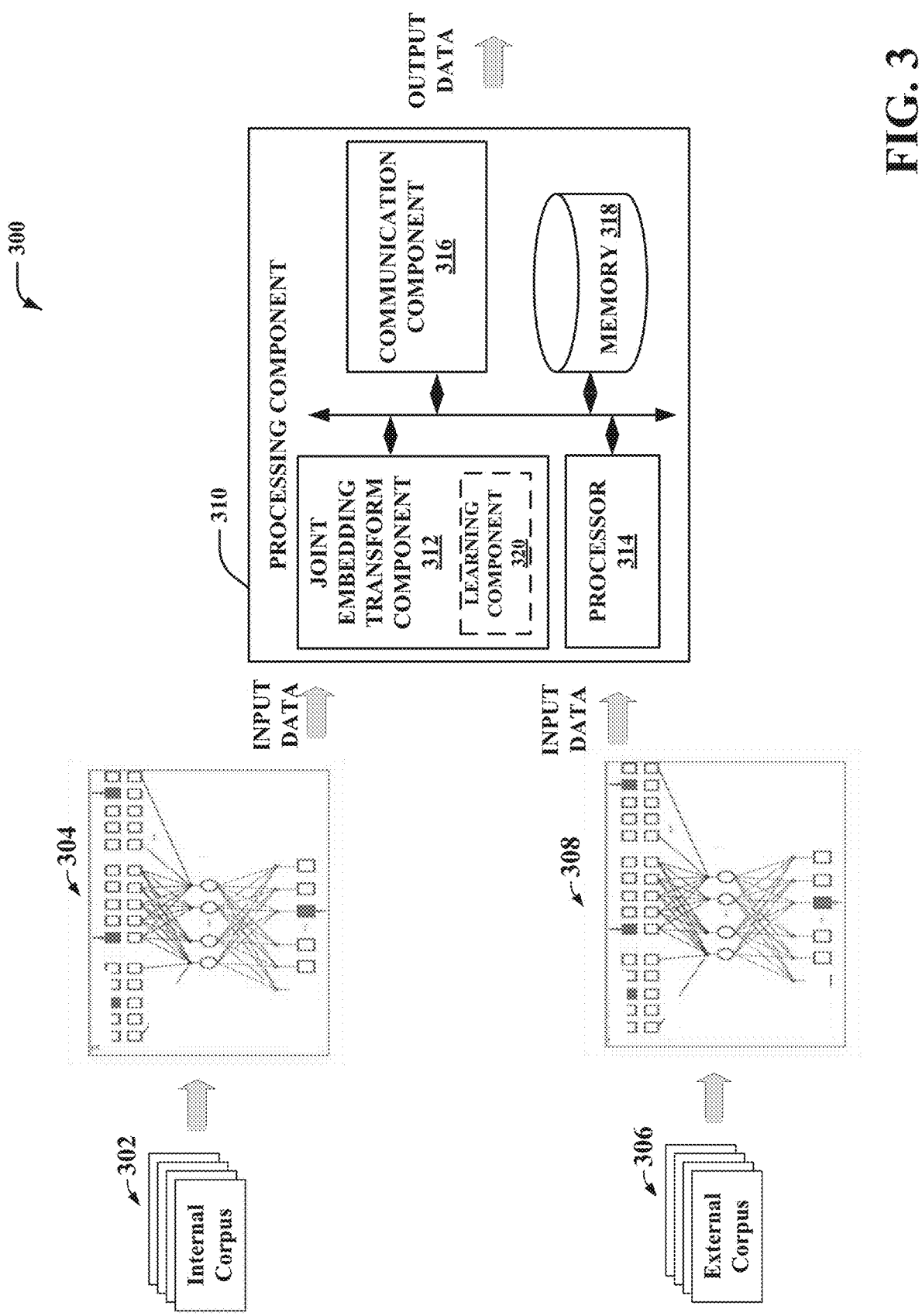
FIG. 3 illustrates yet another block diagram of an example, non-limiting system that facilitates joint embedding of corpus pairs for outside-in mapping in accordance with one or more embodiments described herein.

FIG. 3 illustrates yet another block diagram of an example, non-limiting system that facilitates joint embedding of corpus pairs for outside-in mapping in accordance with one or more embodiments described herein. Repetitive description of like elements employed in other embodiments described herein is omitted for sake of brevity.

In the embodiment shown in FIG. 3, the system 300 can comprise an internal corpus 302 and an external corpus 306. In some embodiments "internal corpus" can mean a repository of words internal to a company or entity and "external corpus" can be a repository of words external to the company or entity. In one aspect of FIG. 3, the internal corpus 302 can be a database of terms specific to a company, entity, organization and/or a marketing platform (e.g., internet webpage). Alternatively, in some embodiments, the external corpus 306 can be a database of terms that are external to the internal corpus 302. Therefore, in an aspect, one output of the system 300 can be information that can indicate and/or be employed to determine which terms between the internal corpus 302 and the external corpus 306 are equivalent and/or substantially equivalent.

The internal corpus 302 can be received as an input at learning block 304. Learning block 304 can then analyze and learn the language embedding for the internal corpus 302 by assessing the internal corpus 302. For example, the internal corpus 302 can be assessed by analyzing the sequence of words and the context in which the words appear to determine the language embedding via equation 1 below:

$$V^1, U^1 = \arg\max\nolimits_{V,U} \prod_{w^1, c^1} S(UVw^1)\bigg|_{c^1} \quad (1)$$

where $w^1$ is a vector representing a word appearing in the corpus, $c^1$ is the ordered set of words in a fixed window on either side of $w^1$, $V^1$ is an embedding matrix used to map $w^1$ the embedding space, $U^1$ a prediction matrix that can predict $c^1$ from the embedding of $w^1$, and S is a non-linear scoring function that evaluates the goodness of fit between the prediction and $c^1$. Equation 1 selects an embedding matrix $V^1$ that produces an embedding that when combined with $U^1$ can accurately predict the context in which a word is likely to appear. Words with similar embeddings using the above model can have similar meanings as words with similar embeddings are predicted to be usable in the same context.

The external corpus 306 can be received as an input to learning block 308. Learning block 308 can analyze and learn the language embedding for the external corpus 306 by assessing the external corpus 306. For example, the external corpus 306 can be assessed for a frequency of words. For example, the external corpus 306 can be assessed for a frequency of words, wherein the frequency of words can determine the language embedding, wherein the frequency of words can determine the language embedding via equation 2 below:

$$V^2, U^2 = \arg\max\nolimits_{V,U} \prod_{w^2, c^2} S(UVw^2)\bigg|_{c^2} \quad (2)$$

where $w^2$ is a vector representing a word appearing in the corpus, $c^2$ is the ordered set of words in a fixed window on either side of $w^2$, $V^2$ is an embedding matrix used to map $w^2$ into the embedding space, $U^2$ is a prediction matrix that can predict $c^2$ from the embedding of $w^2$, and S is a non-linear scoring function that evaluates the goodness of fit between the prediction and $c^2$. Equation 2 selects an embedding matrix $V^2$ that produces an embedding that when combined with $U^2$ can accurately predict the context in which a word is likely to appear. Words with similar embeddings using the above model can have similar meanings as words with similar embeddings are predicted to be usable in the same context.

It should be appreciated that although there are only two corpora represented within FIG. 3, the system 300 can be capable of processing data from multiple corpora in a similar manner. As shown in FIG. 3, the processing component 310 can also include a joint embedding transform component 312 and a communication component 316. In some embodiments, the joint embedding transform component 312 can include a learning component 320. Aspects of the processing component 310 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an aspect, the processing component 310 can also include memory 318 that stores computer executable components and instructions. Furthermore, the processing component 310 can include a processor 314 to facilitate operation of the instructions (e.g., computer executable components and instructions) by the processing component 310.

The joint embedding transform component 312 can receive input data (e.g., INPUT DATA shown in FIG. 3). In an aspect, the input data can correspond to the data described with reference to FIG. 1. For example, in various embodiments, the input data can be a portion (e.g., a section) of the data. The input data can be received, for example, via a network. Alternatively, in some embodiments, the input data can be received from a database in communication with the processing component 310 via a network. In some embodiments, the input data can be data that is transmitted to the processing component 310 and other processing components. In one example, the input data can be a portion of training data (e.g., a trained data set, one or more inputs, etc.) associated with a learning training and/or a mapping process.

The input data from both domains can be processed by the joint embedding transform component 312 via a joint embedding transform between the two domains. For example, in one embodiment, a joint embedding transform A can be learned by a stochastic gradient decent (SGD) by way of equation 3:

$$\arg\max_A f(w_{1,t}^T V^1 A V^2 w_{2,t}, w_{1,f}^T V^1 A V^2 w_{2,f}) \quad (3)$$

where $w_{1,t}$ and $w_{2,t}$ are input matrixes where the corresponding rows of these two matrixes are the representation of pairs of equivalent terms that were identified between the two corpora, $w_{1,f}$ and $w_{2,f}$ are input matrixes where the corresponding rows of these two matrixes are the representation of pairs of non-equivalent terms that were identified in the corpora, and $V^1$ and $V^2$ are the embedding vectors learned in Equation 1 and 2 above for the first and second corpora respectively, and A is a transformation matrix that is learned to transform between the embedding spaces of each corpora.

In one embodiment of equation 3, $w_{1,t}$–$w_{2,t}$ can be known equivalent terms, $w_{1,f}$–$w_{2,f}$ are know non-equivalent terms, and f can be used to maximize the first term or maximize a margin between the two terms. It should also be noted that $V^1$, $U^1$, $V^2$, $U^2$, and A can be learned jointly. Based on the input data, the joint embedding transform component 312 can generate output data (e.g., OUTPUT DATA shown in FIG. 3). The output data can be generated, for example, in response to a training/mapping processing (e.g. a mapping process associated with the input data) that is performed by the joint embedding transform component 312. In one example, the output data can be associated with a model for a neural network associated with processing components. In an aspect, the output data can be stored in the memory 318 or another memory associated with the processing component 310.

In an embodiment, as shown, the joint embedding transform component 312 can include a learning component 320. Alternatively, the learning component 320 can be external to the joint embedding transform component 312. The learning component 320 can perform one or more machine learning computations associated with the data. For example, the learning component 320 can perform one or more clustering machine learning computations, one or more decision tree machine learning computations, one or more instance-based machine learning computations, one or more regression machine learning computations, one or more regularization machine learning computations, one or more rule learning machine learning computations, one or more Bayesian machine learning computations and/or one or more different machine learning computations. In one example, the learning component 320 can perform one or more model learning computations associated with the data. For example, the learning component 320 can perform one or more Bayesian computations, one or more network computations, and/or one or more convolution neural network computations.

Figure 4:
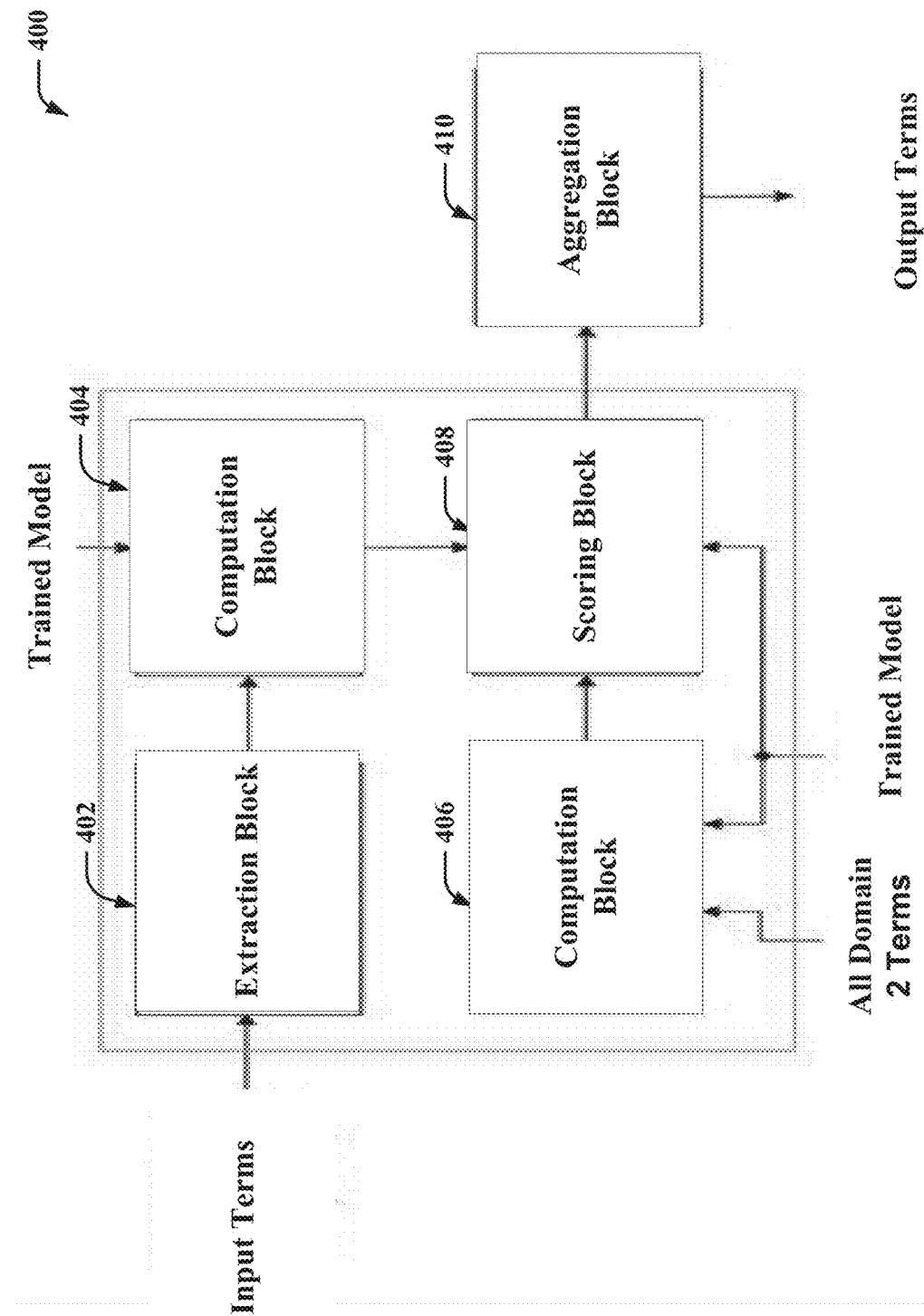
FIG. 4 illustrates an additional block diagram of an example, non-limiting system that facilitates joint embedding of corpus pairs for outside-in mapping in accordance with one or more embodiments described herein.

FIG. 4 illustrates an additional block diagram of an example, non-limiting system that facilitates joint embedding of corpus pairs for outside-in mapping in accordance with one or more embodiments described herein. Repetitive description of like elements employed in other embodiments described herein is omitted for sake of brevity.

In various embodiments, the system 400 can be perform outside-in mapping. In some embodiments, outside-in mapping can include receiving a first domain input, a second domain input, and inputs based on a trained model. In some embodiments, the trained model can be associated with a first domain corpus and a second domain corpus. In some embodiments one or more components of system 400 can be included in the content mapping component 104. It should also be noted that FIG. 4 is another embodiment of components associated with a method of performing the processes associated with FIG. 3. Therefore, in some embodiments, FIG. 3 can be employed and in some embodiments FIG. 4 can be employed. Moreover, the system 400 can be associated with or be included in a data analytics system, a data processing system, a graph analytics system, a graph processing system, a big data system, a social network system, a speech recognition system, an image recognition system, a graphical modeling system, a bioinformatics system, a data compression system, an artificial intelligence system, an authentication system, a syntactic pattern recognition system, a medical system, a health monitoring system, a network system, a computer network system, a communication system, a router system, a server system, a high availability server system (e.g., a Telecom server system), a Web server system, a file server system, a data server system, a disk array system, a powered insertion board system, a cloud-based system or the like.

In the embodiment shown in FIG. 4, the system 400 can comprise an extraction block 402, computation blocks 404, 406, a scoring block 408, and/or an aggregation block 410, one or more of which can be electrically and/or communicatively coupled to one another. As shown in FIG. 4, a first domain term collection, which can be indicated as "input terms" of FIG. 4, can be input into system 400. The term collection can comprise keywords, web-page content, and/or user-profile content. Of the term collection input, a specific term t can be extracted from the term collection at extraction block 402. It should be noted that in this scenario, the first domain term collection is based on an external corpus whereas the second domain terms are related to an internal corpus. The trained model input into computation blocks 404, 406 can be the trained model output from FIGS. 2 and 3. Consequently, based on the trained model information, computation block 404 can compute an embedded representation of term t using the trained model and computation block 406 can compute an embedded representation for one or more of the second domain terms as represented by the internal corpus. It should be noted that the computations of computation blocks 404 and 406 can be performed simultaneously, concurrently or linearly, meaning that computation block 404 does not have to compute its embedded representation before the computation block 406 computes its embedded presentation, although this permutation is possible. It should also be noted that, in some embodiments, one or more of computation block 404 processes and computation block 406 processes can be performed by one component.

The system 400 can provide a score for a joint embedding affinity with term t for one or more of the second domain terms at scoring block 408. The trained model can also be received as an input to scoring block 408 to generate a joint embedding affinity. In one embodiment, the scoring block 408 can return ranked lists of x terms in descending or ascending order of joint score. In some embodiments, external inputs, and ranked entities, can be term collections instead of terms (e.g., specific piece of content or user-content profiles).

In some embodiments, affinity scores can be computed and aggregated across input and output term collections. For example, a Bayesian generation model can be used, where one or more input terms generate an output term with a probability as a function of the affinity score. An overall score can be generated based on a function of a likelihood of an output given the input $P(x_1 x_2 x_3 \ldots | t_1 t_2 t_3 \ldots)$ where $t_1 t_2 t_3 \ldots$ can be a collection of terms from the external domain 1, and $x_1 x_2 x_3$ can be a collection from domain 2.

Equivalent terms in the two corpora can be identified by inferring that textually similar terms are equivalent. It should be noted that known non-equivalent terms can also be generated by randomly permuting one of the two terms in a known equivalent pair. Terms can be further identified by finding terms that have more than a threshold number of occurrences or frequency in both corpora. For instance, the external domain can be profile page resume information regarding a person's experience with cognitive computing. Therefore, "cognitive computing" can be extracted as term t and compared against many similar terms within the internal corpus such as "artificial intelligence." Consequently, scoring block 408 can determine a frequency with which the words "cognitive computing" are used through the external corpus and the internal corpus and assign a score to the terms "cognitive computing" and "artificial intelligence" accordingly. The joint embedding affinity score can then be aggregated across the first domain and the second domain term collections.

Furthermore, in some embodiments, the term collection rankings can be output and can comprise, but are not limited to, keywords, taxonomy tags, content, and/or user profiles. It should be noted that the comparison between the first domain corpus and the second domain corpus can be in the form of comparing one document to many documents, respectively. It should also be noted that the system can be used for content-personalization purposes, for example, for use in a digital marketing platform. For instance, the first domain corpus can be a user profile, and the second domain corpora can be webpages of a website.

The comparison between the first domain corpus and the website can provide an affinity value for terms that are frequent across the user profile and the website. In some embodiments the affinity values for a plurality of terms from each webpage of the website can be aggregated to compute an affinity score for each webpage. The webpages with a high affinity value (e.g., an affinity value greater than or equal to a defined affinity threshold) can then be selected for display to a user associated with the user profile via a display screen. Likewise, the comparison between the first domain corpus and the one or more other user profiles associated with the second domain corpora can provide an affinity value for terms that are frequent across the user profile and the one or more other user profiles. In some embodiments the affinity values for a plurality of terms from each of the user-profiles of the second corpus, can be aggregated to compute an aggregated affinity score for each user profile from the second corpus. The user-profiles from the second corpus with a high aggregated affinity value can then be used to identify content data that may be of interest to the user with the user profile from the first corpus. In some embodiments, this can be done using a recommender system.

In one embodiment, a set of named entities is identified in each corpora using text processing techniques where textually similar named entities can be identified as equivalent.

Figure 5:
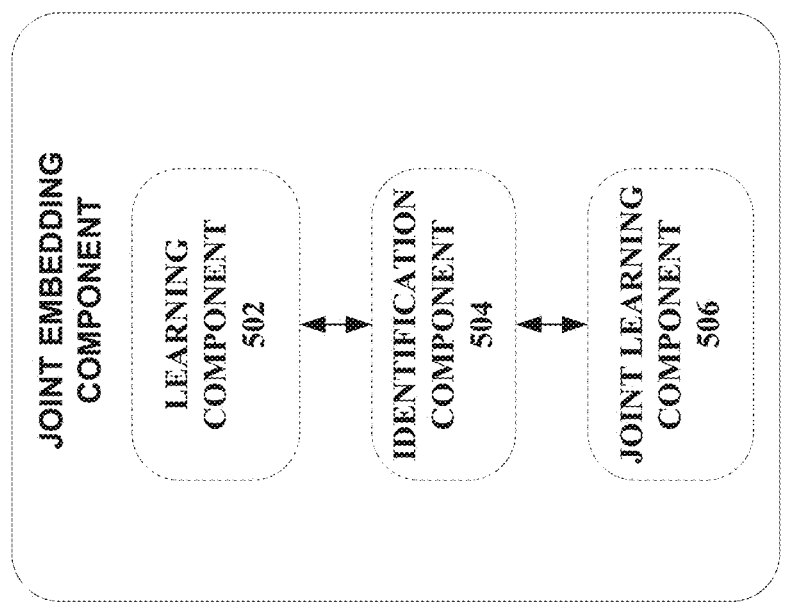
FIG. 5 illustrates an embodiment of a joint embedding component in accordance with one or more embodiments described herein.

FIG. 5 illustrates an embodiment of a joint embedding component in accordance with one or more embodiments described herein. Repetitive description of like elements employed in other embodiments described herein is omitted for sake of brevity.

In the embodiment shown, the joint embedding component 102 comprises several components including, but not limited to, a learning component 502, an identification component 504, and a joint learning component 506. It should be noted that the learning component 502, the identification component 504, and the joint learning component 506 can be electrically and/or communicatively coupled within the joint embedding component 102 in some embodiments. The learning component 502 can receive domain corpora data from several different domains. The domain corpora data can comprise profile data, content data, keyword data, etc. The learning component 502 can learn outside-in term mappings between the corpora for taxonomies and content in an automated unsupervised manner Therefore, in some embodiments, one or more of the domain corpora can be embedded into the learning component 502 using a neural network language-model.

In some embodiments, the identification component 504, can identify known equivalent terms between the domain corpora. It should be noted that the identification component 504 can also identify non-equivalent terms between the domain corpora. Term identification can be facilitated by identifying technical terms across both corpora. Alternatively, term identification can also be accomplished by comparing a non-technical background corpus to the terms of another corpus. A threshold value can also be assigned to the terms to help characterize whether the frequency of the terms within the corpora is high frequency.

The joint learning component 506 can leverage a mathematical transform from one embedded domain to another. For instance, the joint learning component 506 can leverage a SGD to learn a joint embedding transform. A stochastic gradient decent is a stochastic approximation of the gradient descent optimization method for minimizing an objective function that is written as a sum of differentiable functions. Thus, in some embodiments, SGD can determine one or more minimums or maximums by iteration. By applying the SGD to the terms across various domain corpora, the system 500 can determine a representation of one or more terms and generate an affinity score based on the similarity of term representations. The joint learning component 506 can also leverage an unsupervised learning methodology comprising inferring a function to describe a hidden structure from unlabeled data. Since the examples given are unlabeled, there is no error or reward signal to evaluate a potential solution. In various embodiments, unsupervised learning can encompass one or more techniques that seek to summarize and explain key features of the data including, but not limited to, k-means, mixture models, hierarchical clustering, anomaly detection, neural networks, etc.

Figure 6:
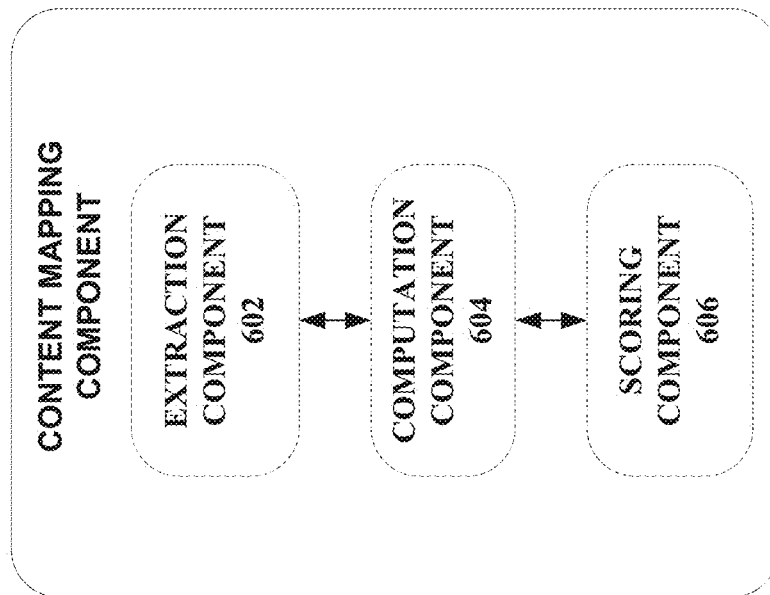
FIG. 6 illustrates an embodiment of a content mapping component in accordance with one or more embodiments described herein.

FIG. 6 illustrates an embodiment of a content mapping component in accordance with one or more embodiments described herein. Repetitive description of like elements employed in other embodiments described herein is omitted for sake of brevity.

The content mapping component 104 as represented in FIG. 6 can include, but is not limited to, an extraction component 602, a computation component 604, and/or a scoring component 606, one or more of which can be electrically and/or communicatively coupled to one another in various embodiments. It should be noted that the extraction component 602, the computation component 604, and the scoring component 606 can be communicatively coupled within the content mapping component 104.

In some embodiments, the extraction component 602 can extract specific terms related to keywords, content, and/or a user profile associated with a first domain corpus. The computation component 604 can receive trained model data from the joint embedding component 102 as represented by FIG. 5. The trained model data can be used to compute embedded representations of an extracted term from the extraction component 602 and embedded representations of terms associated with a second domain corpus.

The scoring component 606 can provide a score for a joint embedding affinity with the extracted term against the second domain corpus. The score can be based on the similarity between the representation of the extracted term (possibly processed through a learned transform such as a linear transform) and the representation of one or more terms in the second domain corpus.

Figure 7:
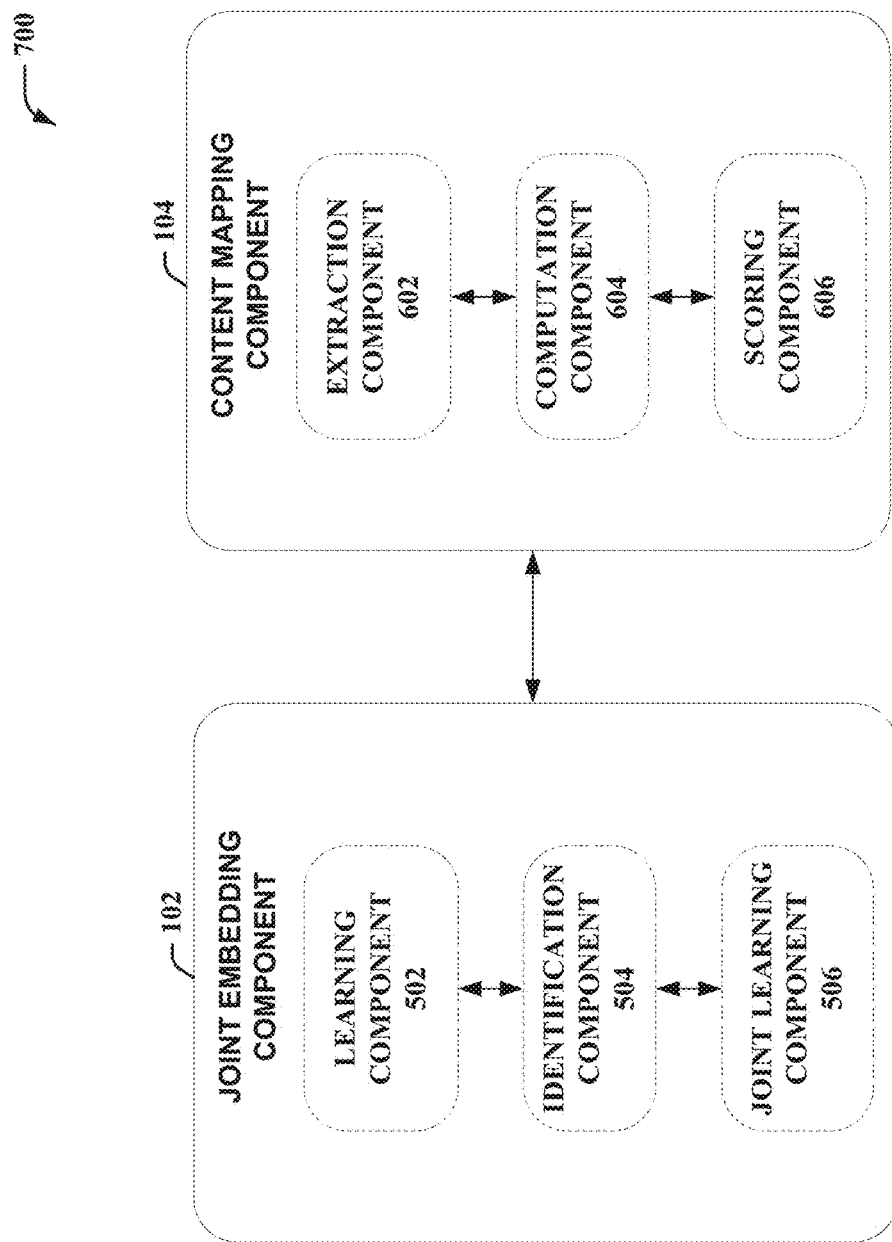
FIG. 7 illustrates yet another example, non-limiting system that facilitates joint embedding of corpus pairs for outside-in mapping in accordance with one or more embodiments described herein.

FIG. 7 illustrates yet another example, non-limiting system that facilitates joint embedding of corpus pairs for outside-in mapping in accordance with one or more embodiments described herein. Repetitive description of like elements employed in other embodiments described herein is omitted for sake of brevity.

The system 700 of FIG. 7 represents another embodiment of the joint embedding component 102 and the content mapping component 104 being electrically and/or communicatively coupled to form the system 700. The joint embedding component 102 can comprise several components including, but not limited to, a learning component 502, an identification component 504, and a joint learning component 506. It should be noted that the learning component 502, the identification component 504, and the joint learning component 506 can be communicatively coupled within the joint embedding system. The learning component 502 can receive domain corpora data from several different domains. The domain corpora data can comprise profile data, content data, keyword data, etc. The learning component can learn outside-in term mappings between the corpora for taxonomies and content in an automated unsupervised manner Therefore, one or more domain corpora can be embedded into the learning component 704 using a neural network language-model.

The identification component 504 can identify known substantially equivalent terms between the domain corpora. It should be noted that the identification component 504 can also identify non-equivalent terms between the domain corpora. Term identification can be facilitated by identifying technical terms across both corpora. Alternatively, term identification can also be accomplished by comparing a non-technical background corpus to the terms of another corpus. A threshold value can also be assigned to the terms to help determine the frequency of the terms within the corpora.

The joint learning component 506 can leverage a mathematical transform from one embedded domain to another. For instance, the joint learning component 506 can leverage SGD to learn a joint embedding transform. The joint learning component 506 can also leverage an unsupervised learning methodology comprising inferring a function to describe a hidden structure from unlabeled data.

The content mapping component 104 as represented in FIG. 7 can include, but is not limited to, an extraction component 602, a computation component 604, and a scoring component 606. It should be noted that the extraction component 602, the computation component 604, and the scoring component 606 can be electrically and/or communicatively coupled within the content mapping component 104. The extraction component 602 can extract specific terms related keywords, content, and/or a user profile associated with a first domain corpus. The computation component 604 can receive trained model data from the joint embedding component 102. The trained model data can be used to compute embedded representations of an extracted term from the extraction component 602 and embedded representations of terms associated with a second domain corpus.

The scoring component 606 can provide a score for a joint embedding affinity with the extracted term against the second domain corpus. The score can be based on the similarity between the representation of the extracted term (possibly processed through a learned transform such as a linear transform) and the representation of one or more terms in the second domain corpus.

Figure 8:
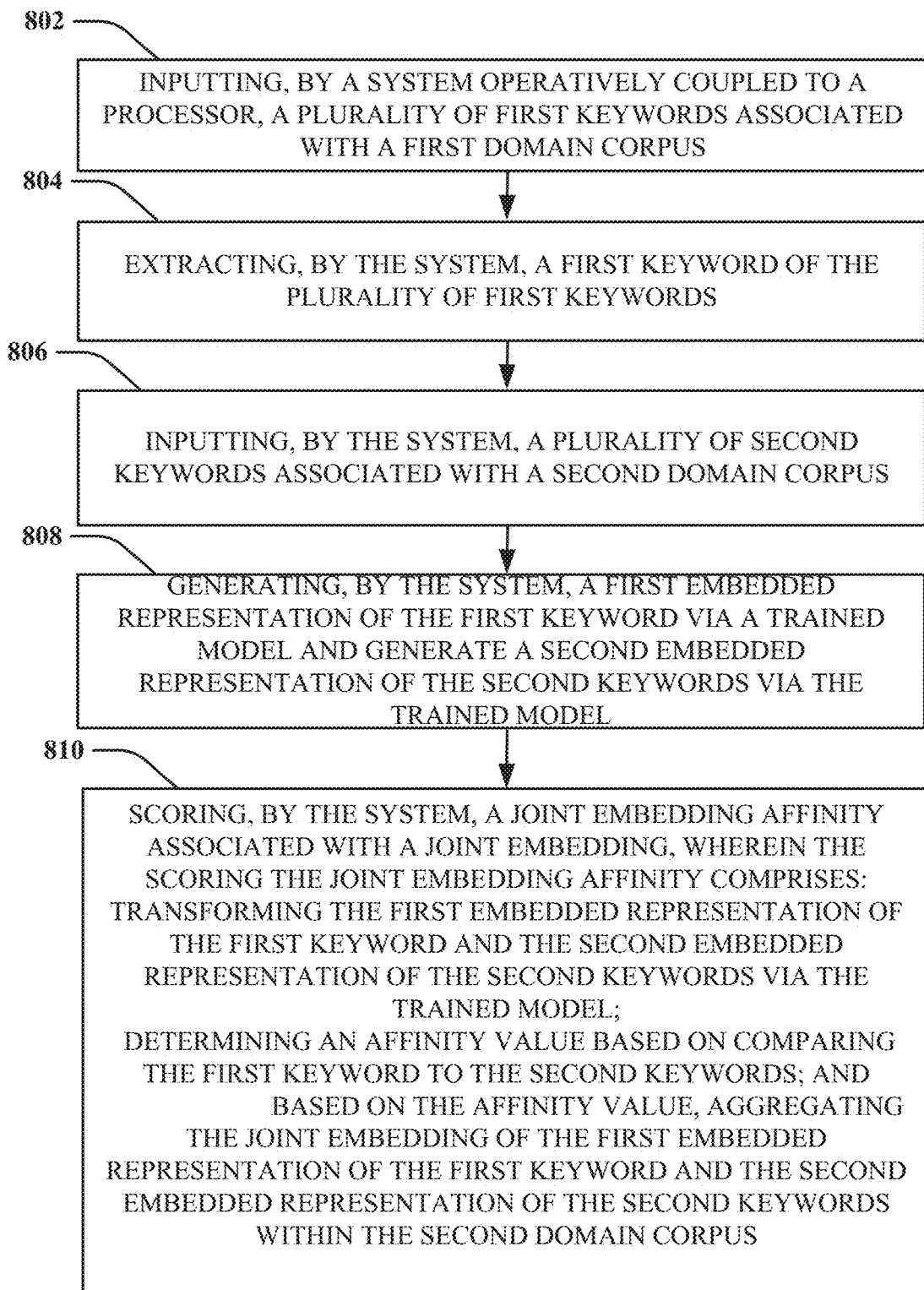
FIG. 8 illustrates a flow diagram of an example, non-limiting computer-implemented method that facilitates a mapping process in accordance with one or more embodiments described herein.

FIG. 8 illustrates a flow diagram of an example, non-limiting computer-implemented method 800 that facilitates a mapping process in accordance with one or more embodiments described herein. Repetitive description of like elements employed in other embodiments described herein is omitted for sake of brevity.

The computer-implemented method 800 can be performed by and/or associated with a plurality of processing components. At 802, one or more inputs associated with a mapping process can be received by the plurality of processing components (e.g., by processing component 310). For example, one or more of the processing components of the plurality of processing components can receive a different one or more inputs associated with the learning process (e.g., by the joint embedding component 102). The one or more inputs can be associated with training data for a mapping process. For instance, the one or more inputs can be a plurality of first keywords associated with a first domain corpus. At 804, the processing components can extract a first keyword of the plurality of first keywords (e.g., by the extraction component 602). The first keyword can be a keyword associated with a profile and/or webpage content of a first domain corpus. At 806, a plurality of second keywords associated with a second domain corpus can be received as one or more inputs to the processing components (e.g., by the joint embedding component 102). The second keywords can be associated with one or more taxonomy tags and/or one or more keyword sets and/or with one or more user profiles and/or webpage content from the second domain corpus. Data generated by a processing component, of the processing components, to form a trained model is provided to all other processing components in a group of processing components that can also include the processing component and the other processing components. At 808, based on the inputs, a first embedded representation of the first keyword via the trained model is generated and a second embedded representation of the second keywords via the trained model is generated by the processing components (e.g., by the joint embedding component 102).

The processing components can also score a joint embedding affinity associated with a joint embedding at 810 (e.g., by the scoring component 606), wherein the scoring the joint embedding affinity can comprise several actions. At 812, an action can comprise transforming the first embedded representation of the first keyword and the second embedded representation of the second keywords via the trained model. At 814, another action can comprise determining an affinity value based on comparing the first keyword to the second keywords. And yet another action can comprise, based on the affinity value, aggregating the joint embedding of the first embedded representation of the first keyword and the second embedded representation of the second keywords within the second domain corpus at 816. Furthermore, a group to which the processing component belongs can be repeatedly changed during the learning process. For example, after one or more processing acts during the learning process, the processing component can be assigned to a new group of processing components for exchanging data. As such, the plurality of processing components can independently perform the learning process to facilitate local amalgamation of data and computation of composite output associated with the plurality of processing components.

Figure 9:
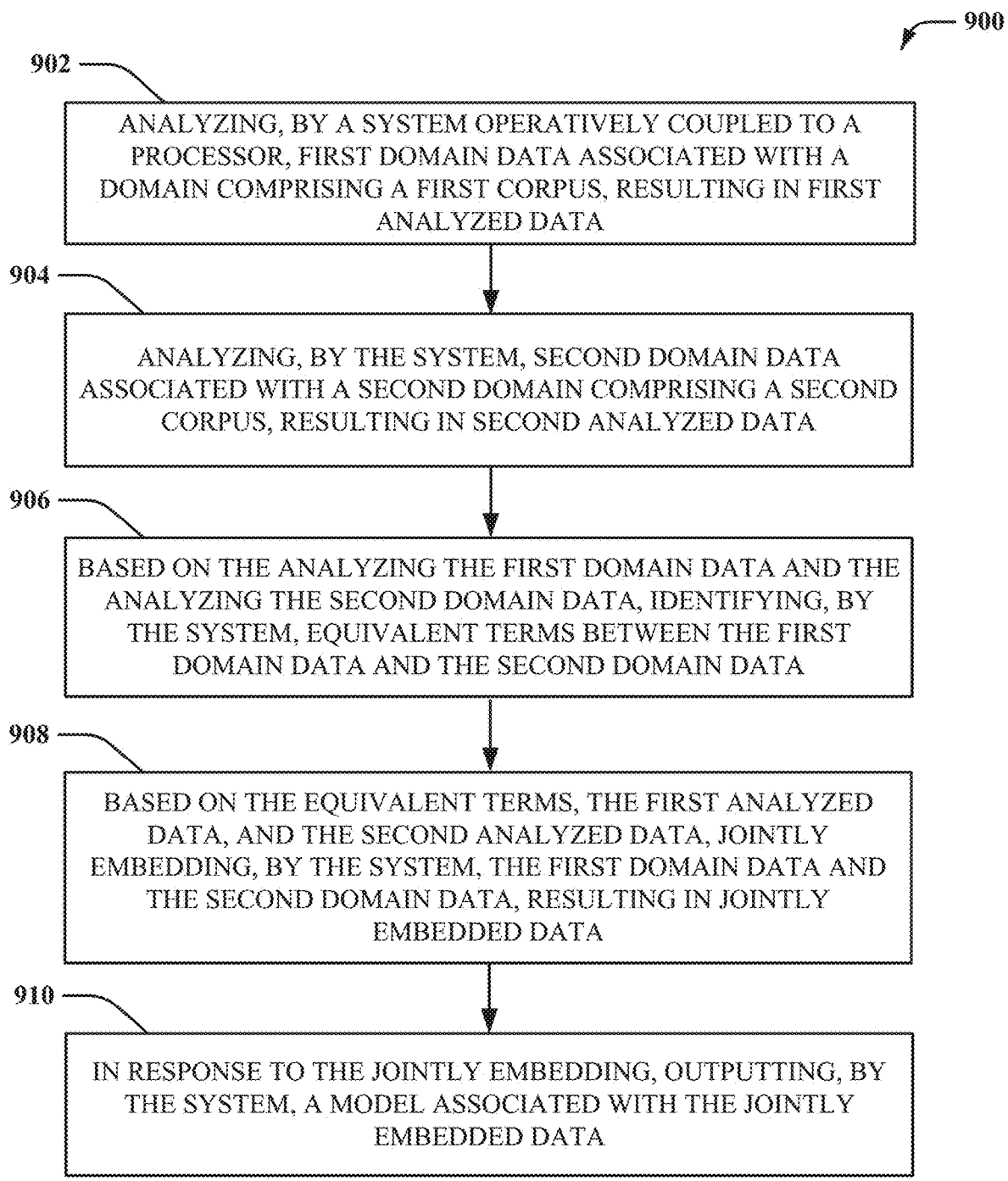
FIG. 9 illustrates a flow diagram of another example, non-limiting computer-implemented method that facilitates development of a training model in accordance with one or more embodiments described herein.

FIG. 9 illustrates a flow diagram of another example, non-limiting computer-implemented method 900 that facilitates development of a training model in accordance with one or more embodiments described herein. Repetitive description of like elements employed in other embodiments described herein is omitted for sake of brevity.

At 902, first domain data associated with a domain comprising a first corpus can be analyzed, resulting in first analyzed data (e.g., by the joint embedding component 102). For example, the first domain data can be received via a network. In an aspect, the first domain data can be received from or stored in a database. The first domain data can comprise first terms associated with a user identity profile of a first domain corpus. In various embodiments, the first domain data can also comprise webpage data, webpage history data, or data found within a text document. In another aspect, other portions of the first domain data can be transmitted to other processing components. At 904, second domain data associated with a second domain comprising a second corpus can be analyzed, resulting in second analyzed data (e.g., by the joint embedding component 102). In various embodiments, the second domain data can comprise taxonomy data, webpage data, user-profile data, keyword set data, and/or data found within a text document. At 904, the second domain data can be processed (e.g., by a computation component 604 of the content mapping component 104) to generate output data (e.g., for associated domains) in the form of a trained model.

At 906, based on the analyzing the first domain data and the analyzing the second domain data, equivalent terms between the first domain data and the second domain data can be identified (e.g., by the joint embedding component 102). At 908, based on the equivalent terms, the first analyzed data, and the second analyzed data, the first domain data and the second domain data can be jointly embedded, resulting in jointly embedded data (e.g., by the joint embedding component 102). Furthermore, in response to the joint embedding, a trained model associated with the jointly embedded data can be output at 910.

The output data can comprise a first embedded representation of a profile term of the first terms, associated with the user identity profile, via a trained model; and a second embedded representation of second terms, associated with a second domain corpus, via the trained model. An indication of a group of processing components can be received (e.g., by a computation component 604 of the content mapping component 104). For example, the indication of the group of processing components can be received via a network. Additionally, the indication of the group can be received from a joint learning component 506. Another processing component can then receive the output data at from the output at 910 and compare the profile term to the second terms to determine an affinity value based on the joint embedding, resulting in a comparison (e.g., by the scoring component 606). Based on the affinity value, the other processing component can aggregate the joint embedding of the first embedded representation of the profile term and the second embedded representation of the second terms within the first domain corpus and the second domain corpus.

The output data can be transmitted (e.g., by the scoring component 606) in the form of the affinity value and the profile term to the second domain corpus. It should be noted that the output data can be sent to one or more of the domains from which corpora was received as an input to the group of processing components. Data from one or more of the processing components in the group of processing components can be received (e.g., by the joint learning component 506 of the joint embedding component 102). For example, one or more parameters from one or more of the processing components in the group of processing components can be received by the joint embedding system. In another example, one or more weights from one or more of the processing components in the group of processing components can be received. In yet another example, one or more gradients from one or more of the processing components in the group of processing components can be received. For example, the output data generated by further processing the input data based on the data can be combined with other data associated with other processing components involved in the training and mapping processes. As such, composite output data associated with the group of processing components can be generated. Additionally or alternatively, the output data generated by further processing the input data based on the data can be stored in a memory and/or transmitted to a remote device (e.g., a server device) via a network.

Figure 10:
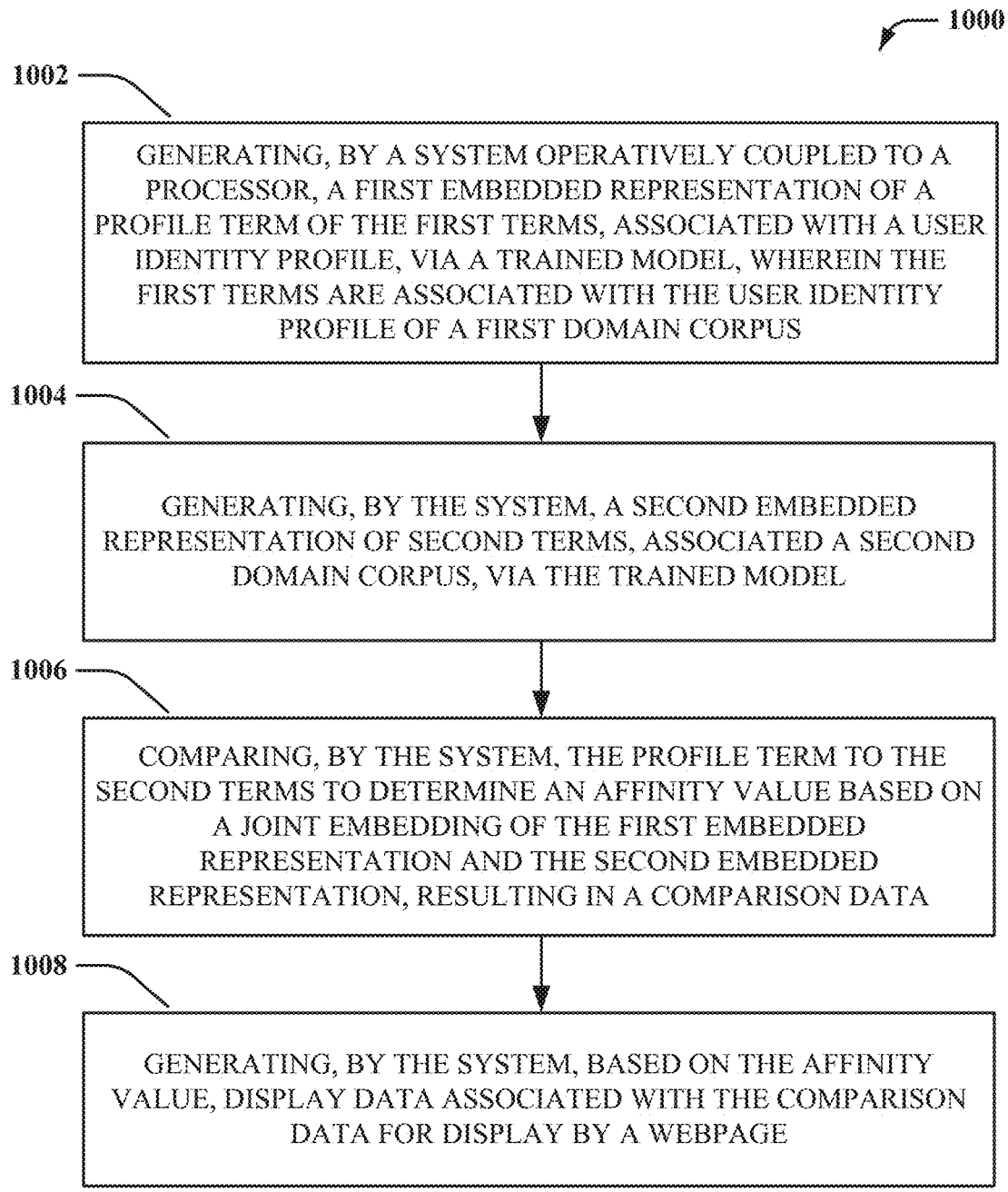
FIG. 10 illustrates a flow diagram of another example, non-limiting computer-implemented method that facilitates display of data based on an affinity value associated with a user profile in accordance with one or more embodiments described herein.

FIG. 10 illustrates a flow diagram of another example, non-limiting computer-implemented method 1000 that facilitates display of data based on an affinity value associated with a user profile in accordance with one or more embodiments described herein. Repetitive description of like elements employed in other embodiments described herein is omitted for sake of brevity.

At 1002, a first embedded representation of a profile term of the first terms, associated with a user identity profile can be generated via a trained model, wherein the first terms are associated with the user identity profile of a first domain corpus (e.g., by the learning component 502 of the joint embedding component 102 of system 700). The first domain corpus can be embedded by a learning component based on input data associated with training data to be generated by the processing components based on the input data (e.g., by the learning component 502 of the joint embedding component 102). The embedded data is analyzed, by the learning component based on a condition associated with the embedded data being determined to have been satisfied, wherein the analyzing can comprise an unsupervised estimation of a statistical distribution characterizing the embedded data (e.g., stored by the memory 318). At 1004, a second embedded representation of second terms, associated a second domain corpus, can be generated via the trained model (e.g., by the learning component 502 of the joint embedding component 102 of system 700).

At 1006, the profile term can be compared to the second terms to determine an affinity value based on a joint embedding of the first embedded representation and the second embedded representation, resulting in a comparison data (e.g., by the scoring component 606 of the content mapping component 104 of system 700). Based on the comparing, the profile term can be mapped to the second terms (e.g., by the content mapping component 104). Mapping the profile term to the second terms can result in mapped data, wherein the mapped data can be output to various user identity profiles so that a scoring value associated with specific terms can be aggregated across the various user profiles. In various different embodiments, the scoring value can comprise a term collection ranking, keyword, taxonomy tag, content, and/or user profile data. The terms can also be ranked in descending or ascending order based on their associated scoring value.

At 1008, display data associated with the comparison data can be generating based on the affinity value and for display by a webpage (e.g., by the system 700). Because the display is based on an affinity value associated with the user profile to a web page, another user profile, or a plurality of user profiles, the display can be representative of commonalities between the user profile and the web page, other user profile, and/or the plurality of user profiles.

Figure 11:
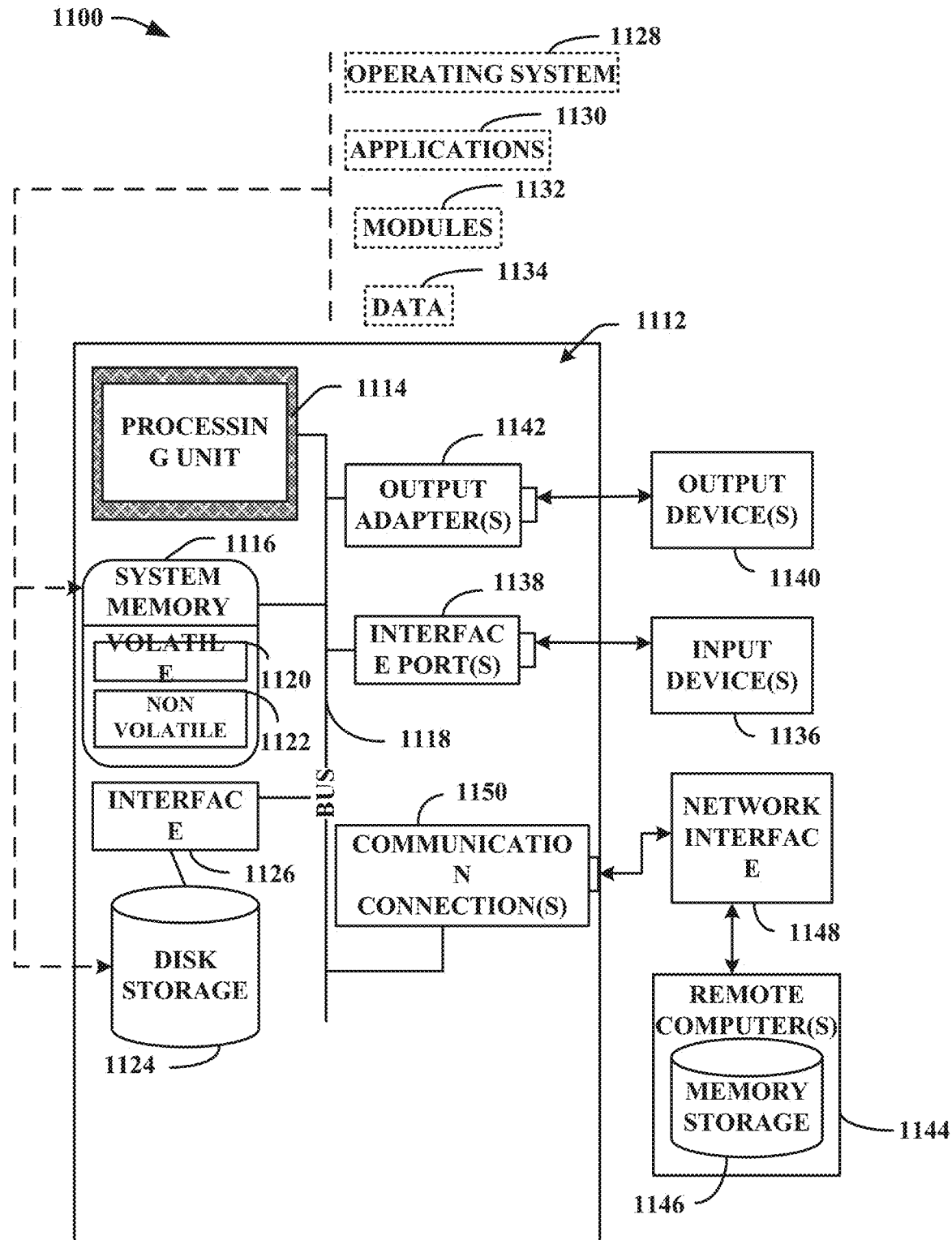
FIG. 11 illustrates a block diagram of an example, non-limiting operating environment in which one or more embodiments described herein can be facilitated.

In order to provide a context for the various aspects of the disclosed subject matter, FIG. 11 as well as the following discussion is intended to provide a general description of a suitable environment in which the various aspects of the disclosed subject matter can be implemented. FIG. 11 illustrates a block diagram of an example, non-limiting operating environment in which one or more embodiments described herein can be facilitated. With reference to FIG. 11, a suitable operating environment 1100 for implementing various aspects of this disclosure can also include a computer 1112. The computer 1112 can also include a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114. The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1116 can also include volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1120 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1112 can also include removable/non-removable, volatile/non-volatile computer storage media. FIG. 11 illustrates, for example, a disk storage 1124. Disk storage 1124 can also include, but is not limited to, devices like a magnetic disk drive, floppy disk drive, tape drive, Jaz drive, Zip drive, LS-100 drive, flash memory card, or memory stick. The disk storage 1124 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1124 to the system bus 1118, a removable or non-removable interface is typically used, such as interface 1126. FIG. 11 also depicts software that acts as an intermediary between users and the basic computer resources described in the suitable operating environment 1100. Such software can also include, for example, an operating system 1128. Operating system 1128, which can be stored on disk storage 1124, acts to control and allocate resources of the computer 1112.

System applications 1130 take advantage of the management of resources by operating system 1128 through program modules 1132 and program data 1134, e.g., stored either in system memory 1116 or on disk storage 1124. It is to be appreciated that this disclosure can be implemented with various operating systems or combinations of operating systems. A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port can be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a computer, a server, a router, a network PC, a workstation, a microprocessor based appliance, a peer device or other common network node and the like, and typically can also include many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1150 refers to the hardware/software employed to connect the network interface 1148 to the system bus 1118. While communication connection 1150 is shown for illustrative clarity inside computer 1112, it can also be external to computer 1112. The hardware/software for connection to the network interface 1148 can also include, for exemplary purposes only, internal and external technologies such as, modems including regular telephone grade modems, cable modems and DSL modems, ISDN adapters, and Ethernet cards.

The present disclosure may be a system, a method, an apparatus and/or a computer program product at any possible technical detail level of integration. The computer program product can include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components; and
   a processor that executes the computer executable components stored in the memory, wherein the computer executable components comprise:
      a first learning component that:
         analyzes first domain data associated with a domain comprising a first corpus, resulting in first analyzed data;
      a second learning component that:
         analyzes second domain data associated with a second domain comprising a second corpus, resulting in second analyzed data;
      an identification component that:
         based on the first analyzed data and the second analyzed data, identifies equivalent terms between the first domain data and the second domain data; and
      a joint embedding component that:
         based on the equivalent terms, the first analyzed data, and the second analyzed data, jointly embeds the first domain data and the second domain data, resulting in jointly embedded data and wherein the jointly embedding comprises analyzing a defined word, a sequence of words in a fixed window on either side of the defined word and generating a prediction of a context in which the defined word is likely to appear; and
         in response to the jointly embedded data, outputs a model associated with the jointly embedded data employed to leverage across other domains to generate additional terms.

2. The system of claim 1, wherein the first domain data comprises a plurality of first keywords associated with a user identity of a user profile.

3. The system of claim 2, wherein the plurality of the first keywords comprise a second keyword associated with a web page.

4. The system of claim 1, wherein the joint embedding component also generates an affinity value related to the jointly embedded data.

5. The system of claim 4, wherein the affinity value is related to a score based on the joint embedding of the jointly embedded data.

6. The system of claim 2, wherein the second domain data comprises a second plurality of second keywords associated with a plurality of identities of a respective plurality of user profiles.

7. A computer program product for generating training data, the computer program product comprising a non-transitory computer readable storage medium having program instructions embodied therewith, the program instructions executable to:
   analyze first domain data associated with a domain comprising a first corpus, resulting in first analyzed data;
   analyze second domain data associated with a second domain comprising a second corpus, resulting in second analyzed data;
   based on the first analyzed data and the second analyzed data, identify equivalent terms between the first domain data and the second domain data;
   based on the equivalent terms, the first analyzed data, and the second analyzed data, jointly embed the first domain data and the second domain data, resulting in jointly embedded data first domain data and the second domain data; and
   a joint embedding component that:
      based on the equivalent terms, the first analyzed data, and the second analyzed data, jointly embeds the first domain data and the second domain data, resulting in jointly embedded data and wherein the jointly embedded data is generated based on analyzing a defined word, a sequence of words in a fixed window on either side of the defined word and generating a prediction of a context in which the defined word is likely to appear; and in response to the jointly embedded data, outputs a model associated with the jointly embedded data employed to leverage across other domains to generate additional terms; and in response to the jointly embedded data, output a model associated with the jointly embedded data.

8. The computer program product of claim 7, wherein the program instructions are further executable to:

identify non-equivalent terms between the first domain data and the second domain data.

9. The computer program product of claim 7, wherein the first analyzed data comprises webpage data associated with a webpage.

10. The computer program product of claim 7, wherein the program instructions are further executable to:

rank the equivalent terms in descending order based on a frequency associated with the equivalent terms, resulting in a ranking.

11. The computer program product of claim 10, wherein the ranking comprises taxonomy tag data associated with a taxonomy tag of the equivalent terms.

12. The computer program product of claim 10, wherein the program instructions are further executable to:

output the ranking to the first corpus.

13. The computer program product of claim 7, wherein the program instructions are further executable to:

generate an affinity value in response to identifying the equivalent terms between the first domain data and the second domain data.

14. The computer program product of claim 13, wherein the affinity value is generated in response to an unsupervised estimation.

15. The computer program product of claim 7, wherein the program instructions are further executable to:

perform a cluster analysis of the first corpus relative to the second corpus.

16. A computer-implemented method, comprising:

analyzing, by a device operatively coupled to a processor, first domain data associated with a domain comprising a first corpus, resulting in first analyzed data;

analyzing, by the device, second domain data associated with a second domain comprising a second corpus, resulting in second analyzed data;

based on the analyzing the first domain data and the analyzing the second domain data, identifying, by the device, equivalent terms between the first domain data and the second domain data;

based on the equivalent terms, the first analyzed data, and the second analyzed data, jointly embedding, by the device, the first domain data and the second domain data, resulting in jointly embedded data and wherein the jointly embedded data is generated based on analyzing a defined word, a sequence of words in a fixed window on either side of the defined word and generating a prediction of a context in which the defined word is likely to appear; and in response to the jointly embedding, outputting, by the device, a model associated with the jointly embedded data.

17. The computer-implemented method of claim 16, further comprising:

in response to the jointly embedding, scoring, by the device, the jointly embedded data.

18. The computer-implemented method of claim 17, further comprising:

in response to the scoring, generating by the device, an affinity value associated with the first domain data and the second domain data.

19. The computer-implemented method of claim 17, wherein an affinity value is related to the scoring of the jointly embedding of the first domain data and the second domain data.

20. The computer-implemented method of claim 16, further comprising:

generating a keyword ranking of keywords related to the first domain data and the second domain data, wherein the keyword ranking comprises taxonomy tag data associated with a taxonomy tag.

* * * * *